(12) United States Patent
De Vleeschouwer

(10) Patent No.: US 7,616,690 B2
(45) Date of Patent: Nov. 10, 2009

(54) METHOD AND APPARATUS FOR ADAPTIVE ENCODING FRAMED DATA SEQUENCES

(75) Inventor: Christophe De Vleeschouwer, Champion (BE)

(73) Assignee: IMEC, Leuven (BE)

( * ) Notice: Subject to any disclaimer, the term of this patent is extended or adjusted under 35 U.S.C. 154(b) by 428 days.

(21) Appl. No.: 10/001,736

(22) Filed: Oct. 31, 2001

(65) Prior Publication Data

US 2002/0114393 A1 Aug. 22, 2002

Related U.S. Application Data

(60) Provisional application No. 60/253,055, filed on Nov. 22, 2000.

(30) Foreign Application Priority Data

Oct. 31, 2000 (EP) ................................ 00870256

(51) Int. Cl.
*H04N 7/12* (2006.01)
*H04N 11/02* (2006.01)

(52) U.S. Cl. .............................. 375/240.16; 375/240.26

(58) Field of Classification Search ............ 375/240.04, 375/240.06
See application file for complete search history.

(56) References Cited

U.S. PATENT DOCUMENTS

| 5,093,720 | A | * | 3/1992 | Krause et al. ................ 348/452 |
| 5,777,680 | A | * | 7/1998 | Kim ....................... 375/240.04 |
| 5,812,197 | A | * | 9/1998 | Chan et al. .............. 375/240.15 |
| 5,892,548 | A | * | 4/1999 | Kim ....................... 375/240.04 |
| 5,917,609 | A | * | 6/1999 | Breeuwer et al. ....... 358/426.12 |

(Continued)

FOREIGN PATENT DOCUMENTS

EP 0 804 034 A2 10/1997

(Continued)

OTHER PUBLICATIONS

Lee, et al., Temporally Adaptive Motion Interpolation Exploiting Temporal Masking in Visual Perception, *IEEE Transactions on Image Processing* 3(5):513-526 (1994).

*Primary Examiner*—David Czekaj
(74) *Attorney, Agent, or Firm*—Knobbe Martens Olson & Bear LLP

(57) ABSTRACT

Methods and apparatus for adaptive encoding of at least a part of a current frame of a sequence of frames of framed data are described which operate on a block-by-block coding basis. The methods and apparatus divide at least a part of the current frame into blocks and then perform a first sub-encoding step on a block. Thereafter a second sub-encoding step is performed on the first sub-encoded block whereby the second sub-encoding step is optimized by adapting its encoding parameters based on a quantity of the first sub-encoded part of the current frame. The quantity is determined by prediction from a reference frame. Then the same steps are performed on another block of the part of the current frame. Typically, the framed data will be video frames for transmission over a transmission channel. The adaptation of the parameters for the second sub-encoding step may be made dependent upon the characteristics or limitations, e.g. bandwidth limitation, of the channel. In addition, the current frame may be discarded based on the predicted quantity and/or based on fullness of a buffer.

6 Claims, 9 Drawing Sheets

U.S. PATENT DOCUMENTS

| | | | | |
|---|---|---|---|---|
| 5,933,194 A | * | 8/1999 | Kim et al. | 348/403.1 |
| 5,969,764 A | * | 10/1999 | Sun et al. | 375/240.06 |
| 6,023,296 A | * | 2/2000 | Lee et al. | 375/240.05 |
| 6,043,844 A | * | 3/2000 | Bist et al. | 375/240.24 |
| 6,175,654 B1 | * | 1/2001 | McVeigh | 382/236 |
| 6,760,478 B1 | * | 7/2004 | Adiletta et al. | 382/236 |

FOREIGN PATENT DOCUMENTS

| | | |
|---|---|---|
| EP | 01 87 0231 | 3/2002 |
| WO | WO 00/18134 | 3/2000 |
| WO | WO 00/46996 | 8/2000 |

* cited by examiner

METHOD AND APPARATUS FOR ADAPTIVE ENCODING FRAMED DATA SEQUENCES

RELATED APPLICATIONS

This Application claims priority to U.S. Provisional application Ser. No. 60/253,055, titled "METHOD AND APPARATUS FOR ADAPTIVE ENCODING FRAMED DATA SEQUENCES", filed Nov. 22, 2000, and European Patent Application No. 008702566, filed Oct. 31, 2000, each of which are incorporated by reference, in their entirety.

BACKGROUND OF THE INVENTION

1. Field of the Invention

The invention relates to encoding methods and apparatus for encoding framed data such as video encoding methods, more in particular to rate control in low cost and large-scale implementation of video coding systems.

2. Description of the Related Technology

Data as often transmitted through data networks in the form of a sequence or stream of packets or frames, i.e., a sequence of discretised data bundles, each bundle having a specific data content. One well-known example of such data streams is a sequence of video frames. These data streams may be encoded especially for reduction in the data rate of the stream-as-transmitted. The reduction of data rate is often necessary in order to reduce the bandwidth of the transmission channel used to transmit the data. Generally, these streams must be encoded and decoded in real-time. This places limitations on the amount of memory and on the processing capacity of the devices used to encode and decode.

A video information stream comprises of a time sequence of video frames. Said time sequence of video frames can be recorded for instance by a video camera/recorder or may be sent from memory or created artificially or synthetically. Each of said video frames can be considered as a still image. Said video frames are represented in a digital system as an array of pixels. Each pixel may be defined by a set of characteristics of the data in the pixel, e.g. each pixel may comprise luminance or light intensity and chrominance or color information. For a recent review of luminance and chrominance see "Colour Image Processing" by Sanwine, Electronics & Communication Journal, vol. 12, No. 5, October 2000, pages 211 to 219.

The information associated with each pixel is stored in a memory of said digital system. For each pixel some bits are reserved. From a programming point of view each video frame can be considered as a two-dimensional data type, although said video frames are not necessary rectangular. Note that fields from an interlaced video time sequence can also be considered as video frames.

In principle when said video information stream must be transmitted between two digital systems, this can be realized by sending the video frames sequentially in time, for instance by sending the pixels of said video frames and thus the bits representing said pixels sequentially in time over a transmission channel.

There exist however more elaborated transmission schemes enabling faster and more reliable communication between two digital systems. Said transmission schemes are based on encoding said video information stream in the transmitting digital system, transmitting said encoded video information stream over a transmission channel and decoding the encoded video information stream in the receiving digital system. Note that the same principles can be exploited for the transmission and storage of data, e.g. to memory or bulk or permanent storage. There is no limit on the types of transmission channel, that is it can comprise a transmission channel of a Local Area Network, either wired or wireless, a Wide Area Network such as the Internet, the air interface of a cellular telephone system, etc.

During encoding the original video information stream is transformed into another digital representation. Said digital representation is then transmitted. While decoding the original video information stream is reconstructed from said digital representation.

For example, the MPEG-4 standard defines such an efficient encoded digital representation of a video information stream suitable for transmission and/or storage. The test model TMN8 of H263 and the verification model of MPEG-4 show that they rely at least on a measure of the prediction error activity of a whole frame. Embodiments exist wherein these models exploit measures of local macroblock (MB) activity.

Encoding requires operations on the video information stream. Said operations are performed on a digital system (for instance in said transmitting digital system). Such processing is often called Digital Signal processing (DSP). Each operation performed by a digital system consumes power. The way in which said operations for encoding are performed is called a method. Said methods have some characteristics such as encoding speed and the overall power consumption needed for encoding.

Said digital system can be implemented in a variety of ways, e.g. an application-specific hardware such as an accelerator board for insertion in a personal computer or a programmable processor architecture. It is well-known that most power consumption in said digital systems, while performing real-time multi-dimensional signal processing such as video stream encoding on said digital systems, is due to the memory units in said digital systems and the communication path between said memory units. More precisely individual read and write operations from and to memory units by processors and/or datapaths and between memories become more power expensive when said memory units are larger, and so does the access time or latency from the busses. Naturally also the amount of read and write operations are determining the overall power consumption and the bus loading. The larger the communication path the larger is also the power consumption for a data transfer operation. With communication is meant here the communication between memory units and the processors and data paths found in said digital system and between memories themselves. There is also a difference between on- and off-chip memories. Note that the same considerations are valid when considering speed as a performance criterion.

As the power consumption of said digital system is dominated by read and write operations, thus manipulations on data types and data structures, such as video frames, said methods are considered to be data-dominated.

As the algorithm specification, the algorithm choice and its implementation determine the amount of operations and the required memory sizes it is clear that these have a big impact on the overall power consumption and other performance criteria such as speed and bus loading.

A method for encoding a video information stream, resulting in a minimal power consumption of the digital system on which the method is implemented, and exhibiting excellent performance, e.g. being fast, must be based on optimized data storage, related to memory sizes, and data transfer, related to the amount of read and write operations.

The channel between said transmitting and said receiving device always has a certain and usually a limited bandwidth.

The amount of bits that can be transmitted per time unit is upper-bounded by the bandwidth available for the transmission. This available bandwidth may be time dependent depending upon network loads. An encoding method which is inefficient or which is not adaptable may result in data being lost or discarded or, at best, delayed. An encoding method should be capable of dealing with such channel limitations by adapting its encoding performance in some way, such that fewer bits are transmitted when channel limitations are enforced. Said encoding method adaptation capabilities should again be power consumption and speed efficient. Performing encoding steps which, due to channel bandwidth adaptations or other limitations become useless and are thus unnecessary, should be avoided. Note that said encoding method adaptation capabilities should be such that the quality of the transmitted data should be preserved as much as possible. Minimum Quality of Service (QoS) requirements should be maintained.

Naturally when such a power consumption and speed optimal encoding method exists it can be implemented on a digital system, adapted for said method. This adaptation can be done by an efficient programming of programmable (application specific) processor architectures or by designing and fabricating an application-specific or domain-specific processor with the appropriate memory units. This can be a stand-alone unit or may be included within a larger processing structure such as a computer.

Prior art encoding methods with adaptation capabilities take into account channel bandwidth limitations by adapting some encoding parameters based on predictions of the bit rate needed, said predictions being based on historic data of said bit rate only. Said bit rate predictions do not take into account a characterization of the current video frame to be encoded. Said prior art encoding method are not using a relation, also denoted model, relating said bit rate, characteristics of the to-be-encoded-video-frame and said encoding parameters [Tihao Chiang and Ya-Qin Zhang, "A New Rate Control Scheme Using Quadratic Rate Distortion Model", IEEE Trans. on Circuits and Systems for Video Technology, vol. 7, No. 1, pp. 246-250, February 1997.], [Wei Ding, and Bede Liu, "Rate Control of MPEG Video Coding and Recording by Rate-Quantization Modeling", IEEE Trans. on Circuits and Systems for Video Technology, vol. 6, No. 1, pp. 12-20, February 1996.].

Prior art encoding methods with good quality preserving properties having adaptation capabilities, taking into account channel bandwidth limitations by adapting some encoding parameters, e.g. by taking into account a characterization of the video frame to be encoded, have severe drawbacks from the implementational point of view, [Jiann-Jone-Chen, and Hsueh-Ming-Hang, "Source model for transform video coder and its application. II. Variable frame coding.", IEEE Trans. on Circuits and Systems for Video Technology, vol. 7, No. 2, pp. 299-311, April 1997.], [Jordi Ribas-Corbera, and Shaw-min Lei, "Rate Control in DCT Video Coding for Low-Delay Communications", IEEE Trans. on Circuits and Systems for Video Technology, vol. 9, No. 1, pp. 172-185, February 1999], [Anthony Vetro, Huifang Sun, and Yao Wang, "MPEG-4 Rate Control for Multiple Video Objects", IEEE Trans. on Circuits and Systems for Video Technology, vol. 9, No. 1, pp. 920-924, February 1999.].

Where the adaptation scheme does work correctly, e.g. it generates a data rate which cannot be transmitted, the system generally only has two options: discard the excess data or stop the processing. The latter is often impossible or undesirable as real-time transmission is required. The former solves the problem with data loss which has to be compensated by other techniques, e.g. regeneration of data by interpolation between frames.

FIG. 8A shows a schematic representation of a prior art encoding scheme with a first encoding step (10) and a second encoding step (20) for encoding a video frame (320) on a time axis (300) with respect to a reference video frame (310). Said encoded current video frame (320) is transmitted via a bandwidth limited channel (60), being preceded with some buffering means (30). Potentially some video frame discarding means (50) are present in between said encoding steps (10) and (20) or before said first encoding step (70). Said first encoding step is executed in a block-based way. (220) represents the block loop, meaning that essentially all blocks are first sub-encoded before said first sub-encoding step is finished with said current video frame and the method moves on to a second sub-encoding step. Said second sub-encoding step can be executed in a similar fashion but with a different loop. Said prior-art method adapts the bit rate, taking into account possible buffer information (100), information about the complexity of the first sub-encoded video frame (140) by either adapting parameters of said second sub-encoding (120) or by discarding said current video frame (150). A decision circuit (40) takes this adaptation decision. Said first sub-encoding step possibly comprises transformation (motion) estimation and transformation (motion) compensation steps (11) and (12). Note that discarding (70) based on buffer (30) fullness information (170) only before first sub-encoding is also often used. No information on video frame complexity is used. An encoder of the above type is known from U.S. Pat. No. 5,969,764, which is incorporated herein by reference.

There still remains a requirement to improve the efficiency of encoding methods and apparatus for streams of framed data such as video frames. In particular there is a need for improved adaptive encoding methods and apparatus for framed data sequences.

SUMMARY OF THE INVENTION

The following reference to "a frame" also includes within its meaning "a video frame".

In a first aspect of the invention a method and an apparatus are provided for encoding a current frame, said method also having adaptation capabilities in case of channel bandwidth limitations. It is especially suited from an implementational point of view as it is block-oriented. Said method, having a first and second sub-encoded steps applicable to blocks of frames, relies on a quantity of the to-be-encoded frame, more precisely of a first sub-encoded version of said to-be-encoded frame, said quantity being predicted only, i.e. directly from a reference frame or frames, these reference frames being at least being first sub-encoded before said current frame. Optionally, the quantity may be predicted before the current frame is buffered. Said quantity can be used for adapting encoding parameters of said second sub-encoding step and/or deciding to skip said second sub-encoding step, hence skipping said current frame. The second sub-encoding step can exploit measures of local macroblock (MB) activity. The blocks may be grouped in a plurality of blocks and the first sub-encoding step being performed on a first set followed the second sub-encoding step on this set before going onto first sub-encoding of another set. The encoding parameters of the second sub-encoding step of at least one block of the first set is adapted based on the quantity predicted from reference frames.

The adaptive encoding method and apparatus is adapted for partitioning or dividing said current frame into blocks and performing a first and second sub-encoding step on blocks. Said second sub-encoding step adapts its encoding parameters based on a quantity of said first sub-encoded part of said current frame as a whole being determined by prediction from a previously encoded reference frame. The quantity may be a motion compensated distortion value for the current frame. This quantity may be derived from a raw motion compensated distortion measure determined for a reference frame which is not the current frame. This raw measure is then compensated to allow for the time-dependent nature of the frame data between the reference frame and the current frame. For example, if the frames are video frames, motion vectors determined for the reference frame may be used to predict the quantity relating to the motion compensated current frame from the raw measure. In particular the determination of the raw measure may include the steps of determining high and low distortion portions in the reference frame based on motion vectors of these portions of the reference frame. Said quantity is not determined from said first sub-encoded part of said current frame as a whole as at this stage of the encoding process said first sub-encoded part of said whole current frame is not yet available. Said steps are performed block-per-block of said current frame. In a sequence of video frames the quantity may be an estimate of a motion-compensated distortion measure which is predicted only, i.e. directly, from reference frames which are not the current frame. Also the quantity is calculated only from reference frames independently of the degree of motion in the video frames. Whether or how to encode a current frame is then made based on this estimate and a compressed video bitstream for the sequence of video images is based on the determination of how to encode the current frame. The steps of generating this quantity may include generating a first and a second distortion measure wherein the first distortion measure characterizes one or more relatively low distortion portions of a reference frame and the second distortion measure characterizes one or more relatively high distortion portions of the reference frame. The determining of high and low distortion portions is preferably based on motion vectors of these portions. The quantity is then generated from these two distortion measures.

In a second aspect of the invention adaptation capabilities in case of channel bandwidth limitations, is presented. Said quantity is used for adapting encoding parameters of said second sub-encoding step or deciding to skip said second sub-encoding step entirely. Said quantity computation can be based on the labeling of blocks of said reference frame, said labeling being based on the results of said first sub-encoded step applied to said reference frame.

Within said adaptive encoding method and apparatus, a step of partitioning or dividing a reference frame into blocks, or into sets of blocks a step of labeling said blocks or sets of blocks in accordance with the performance of the first sub-encoding applied to said reference frame, a step of computing a quantity based on said labeling of said blocks or sets of blocks and of performing a first and second sub-encoding step on the to-be-encoded current frame can be distinguished. Said second sub-encoding step adapts its encoding parameters based on said quantity. In an embodiment said first and second encoding steps applied to said to-be-encoded current frame are performed per block of said current frame or per set of blocks.

The bit rate control methods in accordance with the present invention solve the problem of apparent incompatibility between local and sequential processing of frame data and use of the most efficient rate control algorithms, i.e. the ones that rely on rate-distortion models whose parameters are computed by a pre-analysis of the complete frame to be encoded. An embodiment of the invented method is a hybrid scheme comprising motion compensation and displaced frame difference coding, avoiding the pre-analysis stage while keeping the benefit from rate-distortion based rate control, by predicting mean absolute difference MAD of the expected prediction error.

The present invention may provide a method of adaptive encoding at least a part of a current frame of a sequence of frames of framed data, comprising the steps of:

dividing said part of said current frame into blocks or sets of blocks;

performing a first sub-encoding step on a first block or set of blocks; thereafter performing a second sub-encoding step on said first sub-encoded block or set of blocks, said second sub-encoding step adapting its encoding parameters based at least on a quantity of said first sub-encoded part of said current frame, said quantity being determined by prediction only from a reference frame or frames; and said steps are performed on another block of said part of said current frame. The prediction preferably allows for the time-dependent variation in the framed data between the reference frame or frames and the current frame.

Subsequently, the steps are performed on another block of said part of said current frame. The adaptive encoding method is capable of taking into account channel bandwidth limitations by adapting said second sub-encoding steps encoding parameters based on said quantity. The method may comprise the step of transmitting said second sub-encoded blocks over the channel which channel bandwidth limitations are taken into account. The method includes that said adaptive encoding of at least a part of said current frame is performed with respect to a reference frame, said first sub-encoding step comprising:

performing motion estimation of a block with respect to said reference frame; thereafter performing motion compensation of said block; and thereafter determining the error block.

The method can include that said adaptive encoding of at least a part of said current frame is performed with respect to a reference frame, said first sub-encoding step comprising:

performing transformation parameter estimation of a block with respect to said reference frame; thereafter performing a transformation compensation step on aid block; and thereafter determining the error block.

The method may also include that said second sub-encoding step is selected from the group comprising of wavelet encoding, quadtree or binary coding, DCT coding and matching pursuits.

The present invention may provide a method for encoding a sequence of frames of framed data comprising the steps of:

determining for at least one current frame, selected from said sequence of frames an encoding parameter based on a quantity of said current frame being determined by prediction only from reference frames; and thereafter encoding said current frame taking into account at least said encoding parameter.

The method can include that said encoding step takes into account at least one encoding parameter being determined directly from at least one of said reference frames.

The method can include that said encoding parameter of said current frame and said encoding parameter of said reference frame are of the same type.

The method can also include that said encoding step exploits an average of said encoding parameter of said current frame and said encoding parameter of one of said reference frames.

The method also includes that said quantity of said current video frame is determined from one reference frame, said quantity determination comprises the steps of identifying within said reference frame a first and second region, determining a first region quantity for said first region, a second region quantity for said second region and computing said quantity of said current frame from the first region quantity, said second region quantity and the time interval between said reference frame and said current frame. The method can also include that said first region is related to intra-coded parts and substantially non-moving parts of said reference frame and said second region being related to moving parts of said reference frame.

The method can also include that said quantity is compensated for the time difference between the reference frame and the current frame; e.g. in accordance with a model of the time dependent nature of the framed data. For instance the prediction can be based on said second region quantity multiplied with said time interval. The method also includes that said quantity is a measure of the information content within said current frame. The method also includes that said quantity is a measure of the energy content within said current frame. The method also includes that said quantity is a measure of the complexity of said current frame. The method also includes that said first and second region quantities are a measure of the information content within said first and second region of said current frame. The method also includes that said measure is derived from the sum of absolute difference between the motion compensated current frame and the previous frame. The method also includes that said measure is derived from the error norm between the motion compensated current frame and the previous frame. The method also includes that said measure is derived from the sum of an absolute difference between the first region or second region of the motion compensated current frame and a previous frame. The method also includes that said measure is derived from the error norm between first region or second region of the motion compensated current frame and the previous frame. The method also includes that the above steps are applied to parts of said current frame. The method also includes that said current frames are divided into blocks and said steps are applied on a block-by-block basis. The method further comprises selecting either that said encoding step is based on an encoding parameter based on said quantity being predicted or said encoding being based on a combination of said encoding parameter based on said quantify being predicted and said encoding parameter being determined directly from at least one of said reference frames. The method may also include that said selection is based on detection of oscillations in the generated sequence of encoding parameters.

The present invention may provide a method for encoding a sequence of frames of framed data, comprising the step of determining for at least one current frame of said sequence of frames whether said current frame will be selected for encoding before encoding said current frame. The method may include that said selection is based on a prediction of a quantity of said current frames from reference frames.

The present invention includes a method for encoding a sequence of frames of framed data comprising the step of determining for at least one current frame of said sequence of frames which encoding parameters will be used for encoding said current frame before encoding said current frame with said encoding parameters. The method may include that said determining of encoding parameters is based on a prediction of a quantity of said current frames only from a reference frame or from reference frames.

The present invention may provide a method of adaptive encoding at least a part of a current frame of a sequence of frames of framed data with respect to a reference frame comprised in the sequence, the method comprising the steps of:

dividing said reference frame into blocks and labeling said blocks of said reference frame in accordance with the performance of a first sub-encoding step applied to said reference frame;

computing a quantity based on the labeling of said blocks;
performing said first sub-encoding step on said current frame;

performing a second sub-encoding step on said first sub-encoded frame, said second sub-encoding step adapting its encoding parameters based on said quantity.

The present invention provides a method of adaptive encoding at least a part of a current frame of a sequence of frames of framed data, with respect to a reference frame comprised in the sequence, the method comprising the steps of:

dividing said reference frame into blocks;

performing a first sub-encoding step on said reference frame with respect to a previous reference frame;

labeling said blocks of said reference frame based on said first sub-encoding steps performance and a blocks motion vector;

determining for each of said blocks of said reference frame a measure of difference between related blocks in said previous reference frame;

computing a quantity from said measures of differences for said blocks and exploiting the labeling of said blocks;
performing said first sub-encoding step on said current frame; thereafter performing a second sub-encoding step on said first sub-encode frame, said second sub-encoding step adapting its encoding parameters based on said quantity. The method may include that said computing of said quantity takes into account the time elapsed between said current frame and said reference frame. The method may include that said blocks of said reference frame have a first label when said blocks are intra-coded or when said blocks have a substantial zero motion vector, said blocks of said reference frame have a second label otherwise, said computed quantity being the sum of:
the sum of all measures of differences of blocks with a first label; a normalized sum of all measures of differences of blocks with a second label multiplied with the time elapsed between said current frame and said reference frame.

The present invention will be described with reference to the following drawings.

BRIEF DESCRIPTION OF THE DRAWINGS

FIG. 5, 6, 7 show some more comparisons described in the text below.

DETAILED DESCRIPTION OF THE EMBODIMENTS OF THE INVENTION

Figure 1:
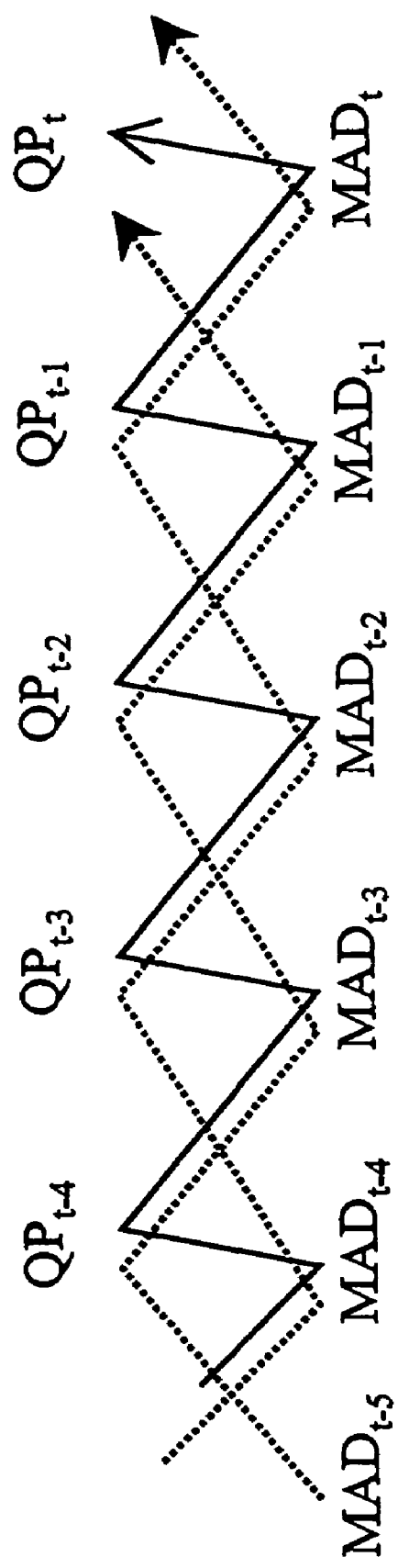
FIG. 1 shows the quantisation parameter (QP) (selected as the to be adapted parameter here in this embodiment) dependency on the mean absolute difference (selected in this embodiment as the measure of frame complexity) for prior art pre-analysis based techniques (solid lines) and the invented prediction based approach.

The present invention will be described with reference to certain embodiments and drawings but the present invention is not limited thereto but only by the claims. In particular, the present invention will mainly be described with reference to video streams but the present invention may be applied to other data streams such as pure audio streams or other forms of packetised data streams. In particular, the present invention will be described with reference to block encoding however, the present invention may also be performed on sets of blocks.

One aspect of the present invention concerns a method of encoding a sequence of video frames. Said encoding method comprises at least two sub-encoding steps within said method. A first sub-encoding step performs a first partial encoding of a video frame or a part thereof. A second sub-encoding step performs a second partial encoding of the result of said first sub-encoding method. In accordance with an aspect of the present invention the sub-encoding steps are not performed on the video frame or parts thereof as a whole but on blocks of said video frame. Each sub-encoding step may comprise several steps, i.e. is a sub-encoding method in its own right.

Depending on the content of the sequence of video frames, said encoding method can result in a bit stream, to be transmitted over a channel, which can vary in the amount of bits per time unit. As a channel generally has a limited bandwidth and storage resources, useful for buffering the bit stream temporarily, at a device are also generally limited in size, methods within said encoding methods for dealing with such overflow situations are preferred. Said methods adapt the encoding performed by the encoding methods. Said methods can be denoted adaptation methods. A first adaptation method decides on whether the video frame under consideration will be skipped, meaning will not be encoded, hence not be transmitted. Said first adaptation method performs a so-called hard decision. A second adaptation method decides on the amount of bits that can be spend for a video frame while encoding. Said second adaptation method performs a so-called soft decision.

Said first adaptation method, further denoted skip method, can exploit the result of a first sub-encoding method, which includes the decision whether the video frame will be skipped or not. This implies that the situation can occur that already performed encoding effort, more in particular first sub-encoding, has already been carried out (has taken up resources) although it is not further needed as the video frame will not be encoded. Such situations are less preferred when dealing with devices with limited resources and when power consumption, speed and video content are to be optimized.

Said second adaptation method, further denoted an adaptive quantization method, can exploit the result of said first sub-encoding method for determining or adapting parameters, e.g. the quantization parameter, to be used in said second sub-encoding method, in order to send a targeted number of bits. Said adaptive quantization method determines said quantization parameter based on essentially all blocks of said first sub-encoded video frame in order to have a homogeneous quality over said frame. As both said sub-encoding methods are typically block-oriented, meaning executed for each block separately, said non-block oriented decision taking within said adaptive quantization method does not match well with said sub-encoding methods from the viewpoint of data transfer and storage, leading to sub-optimal power consumption.

It should be noted that skipping or discarding before the first sub-encoding based on buffer-fullness information only and hence not taking into account complexity information about the video frame to be encoded is known.

An encoding method being having adaptation methods can be denoted an adaptive encoding method. An adaptive encoding method may comprise the steps of dividing said part of said video frame to be encoded into blocks (step 904 of FIG. 9), then performing for essentially all of said blocks a first sub-encoding step (step 908 of FIG. 9). Thereafter determining a quantity of said first sub-encoded part of said video frame. Said quantity is then used for determining the second sub-encoding steps parameters. Said second sub-encoding step is then executed (step 912 of FIG. 9) using these parameters in a block-oriented way, like said first sub-encoding step, thus for essentially all block of said part of said video frame separately but one after another. It must be emphasized that said second sub-encoding method needs a quantity which is characteristic for said part of said video frame as a whole for quality homogenous reasons. This results in a bad data locality, meaning that said first encoding step consumes blocks and produces first sub-encoded blocks which need to be stored. Essentially all said first sub-encoded blocks are needed before the said second sub-encoding step can be started, which will consume again said first sub-encoded blocks. The adaptive nature of said encoding method requires adaptation of the encoding parameters, more in particular said second sub-encoding steps parameters, based on the varying content of the video frame or part thereof to be encoded. Said adaptation is thus in principle based on a global quantity of said video frame or part thereof, more in particular, said first sub-encoded video frame or part thereof. The block-based nature of said sub-encoding methods cannot be exploited optimally for power consumption optimization because the adaptive nature of said encoding method needs a global quantity, thus a plurality of blocks is needed.

In an embodiment of the present invention, said quantity related to a characteristic for said video frame or part thereof, more in particular of said first sub-encoded video frame or part thereof, is not determined from said first sub-encoded blocks but replaced by a predicted quantity. That is the quantity to be used for adapting the second sub-encoding step is generated without the first sub-encoded step being applied to the current frame. In fact no processing of the current frame is necessary as the quantity is derived only from a reference frame or reference frames. Hence, the current frame does not even need to be buffered for the quantity to be determined. Within the meaning of prediction is included both forward and backward prediction. The "quantity" is preferably a value related to the expected data content or data rate. Hence, this quantity preferably allows adaptation of the parameters of the second sub-encoding step to optimize the data rate. Said predictive determination of said quantity is performed before the second sub-encoding step starts. As said predictive determining of said quantity does not need said first sub-encoded blocks, and thus said predictive determining of said quantity is independent of said first sub-encoded blocks in this sense, both sub-encoding methods can be combined in a single loop. Thus, said first and said second sub-encoding step are performed after each other on a block before one starts said sub-encoding steps on another block.

This embodiment of an encoding method in accordance with the present invention takes into account channel bandwidth limitations by adapting some encoding parameters of the second sub-encoding step based on a calculated value of the bit rate needed thereby taking into account a characterization of the video frame to be encoded. Said invented encoding method thus uses a relation, also denoted model, relating said bit rate, characteristics of the to be encoded video frame and said encoding parameters. More particularly, said invented encoding method uses a prediction of a characteristic of the video frame to be encoded. Within said model an estimate or predicted value is used.

By using a relation between bit rate, video frame characteristics and encoding parameters, the invented encoding method does provide adaptive encoding capabilities which has improved video quality preservation. Moreover, by explicitly using an estimate or prediction of a characteristic of the to be encoded video frame said encoding method can be implemented in an efficient way.

The invented encoding method constructs from relations between bit rate, encoding parameters and a characteristic of the to be encoded video frame adaptive encoding methods. The invented encoding method avoids the sole use of historic bit rate data for taking decisions concerning encoding parameter adaptations as is done in prior art predictive control approaches (which is actually unreliable) and hence the invention shows high quality preserving properties. Moreover the use of a predicted characteristic of the to be encoded current video frame makes it especially adapted from an implementational point of view. The term "predicted" includes within its scope allowing for the time difference between a reference frame and a current frame in accordance with a model which allows for the time dependent nature of data in the data frames.

Encoding of the video information stream results in the generation of another digital representation of said video information stream. Said another digital representation is preferably more efficient for transmission and/or storage. Said encoding can be based on the fact that temporal nearby video frames are often quite similar except for some motion within the image. The arrays of pixels of temporally close video frames often contain the same luminance and chrominance information except that the coordinate places or pixel positions of said information in said arrays are shifted by some locations or distance. Shifting in place as function of time defines a motion. Said motion is characterized by a motion vector. Encoding of the video information stream is done by performing encoding of said video frames of said time sequence with respect to other video frames of said time sequence. Said other video frames are denoted reference video frames. Any video frame may be a reference frame. Said encoding is in principal based on motion estimation of said motion between a video frame and a reference video frame. Said motion estimation defines a motion vector. When the motion is estimated, a motion compensation is performed. Said motion compensation comprises constructing a new motion compensated video frame from the reference video frame by applying the found motion. Said motion compensated video frame comprises the pixels of said reference video frame but located at different coordinate places. Said motion compensated video frame can then be subtracted from the video frame under consideration. This results in an error video frame. Due to the temporal relation between the video frames said error video frame will contain less information. This error video frame and the motion estimation vectors are then transmitted, after performing some additional coding of the error video frame. The encoding method described above has a first sub-encoding step comprising motion estimation and motion compensation. The result of said first sub-encoding step, denoted a first sub-encoded video frame, is actually the obtained error video frame. The further coding of said error video frame can be denoted by a second sub-encoding step. Recall that said motion estimation and compensation is not necessarily performed on a complete video frame but on blocks of said video frame. The result of said first sub-encoding step in a block oriented approach is thus more precisely an error block.

If a quantity of an error frame, being the result of a first sub-encoding of a video frame with respect to a reference video frame, is to be determined before said first sub-encoding is completed, then the quantity has to be predicted or estimated only from other frames. Predicting said quantity for a video frame, also denoted current video frame, which should be at least an estimate of the quantity obtained as a result of an actual first sub-encoding of said current video frame, can take into account how said quantity will change when compared with the same quantity of a previous encoded video frame, now used as reference video frame. As said first sub-encoding is such that the differences between said current video frame and said reference video frame are extracted up to some motion between said current and said reference video frame, said prediction can be based on predicting how said differences will evolve with time. As said first sub-encoding is based on minimizing the differences between said current video frame and said reference video frame, and hence their quantities would in ideal case be the same, said difference evolution prediction can in fact try to take account failure of said first sub-encoding to minimize the differences. Alternatively, said predictive determination of said quantity of said current video frame can be said to be based on the performance of said first sub-encoding, more precisely on an estimate or prediction of how said first sub-encoding would actually perform when applied to said current video frame.

In an embodiment of the invention said predictive determination of said quantity of said current video frame, being based on a predicted performance of said first sub-encoding when applied to said current video frame, exploits the actual performance of said first sub-encoding when applied to a previous video frame, used as reference video frame. In fact, only a reference frame or reference frames is/are used in this estimation. The current frame is not used. The previous frame can be the next previous frame or another previous frame.

A particular embodiment of the present invention comprises an exploitation of the actual performance of said first sub-encoding when applied to a previous video frame with a first sub-encoding being based on motion estimation and motion compensation. In this embodiment after having performed said first sub-encoding on a previous video frame, for essentially all the blocks into which the previous video frame is divided or partitioned, conclusions can be drawn in respect to said first sub-encoding performance for each block separately. The present invention includes generating a raw distortion value based on the motion content of blocks of the reference frame. When said first sub-encoding performance of a block is below a certain level, it can be decided to encode that block itself instead of the related error block. Such a block is labeled then as an intra-coded block. For the related block in the current still to be encoded video frame, it can be assumed in this context, that said first sub-encoding will have the same performance, hence the quantity determined for the block in said previous frame can be taken as a good estimate of the quantity of the block in said current frame. When said first sub-encoding based on motion estimation has found for a block in said previous frame, a zero motion vector with an acceptable sub-encoding performance, it can be assumed to be in a still image part of the video frame sequence. It can be assumed in this context (at least as an approximation), that said first sub-encoding will find the same zero (or near-zero) motion vector for the related block in the current video frame, and hence the quantity of the related block in both frames will remain the same (or approximately the same). For a block of the previous video frame which is not-intra-coded and has a non-zero motion vector, first sub-encoding failure is due to a mismatch between the actual changes between the current video frame and the reference video frame and the translational model for which the first sub-encoding tries to compensate. The contribution to the current video frame quantity of such non-intracoded moving blocks due to movement error is due to the dynamic nature time dependent, more particular related to or dependent on, more precisely proportional to the time elapsed between the current video frame and the reference video frame.

Note that although the above described similarity despite some motion of video frames appears only in ideal cases, it forms the basis of encoding based on a translational motion model. The transformation between a video frame and a temporally close video frame can also be a more complicated transformation. Such a complicated transformation can form the basis of a more complicated encoding method. Within such a more general approach the method may include a step of determining the parameters of the assumed applied transformation by estimation, performing an associated compensation for said transformation by applying said transformation on the reference frame and determining an error video frame. Said first sub-encoding method then comprises transformation parameter estimation, performing transformation compensations and determining an error video frame. Such a complicated or more global transformation can comprise various digital processing steps, such as translation, rotation, scaling, zoom and/or any combination thereof.

Alternatively formulated, said adaptive encoding method comprises a step of identifying within said reference video frame a first and a second region, determining a first region quantity for said first region, a second region quantity for said second region and computing said quantity of said current video frame from the first region quantity, said second region quantity and the time interval between said reference video frame and said current video frame. Said first region is related to intra-coded parts and substantially non-moving parts of said reference video frame and said second region is related to moving parts of said reference video frame. This generates a raw distortion measure. The final reference quantity is based on said second region quantity multiplied by said time interval.

In the above described encoding methods the use of reference video frames is presented but the invention is not limited thereto. As long as a first sub-encoding method of any kind and a second sub-encoding method of any kind can be distinguished and that the parameters of said second sub-encoding method need to be adaptable for resource constraints in general and channel bandwidth limitations in particular and said adaptation is in principle depending on the intermediate result obtained after said first sub-encoding, the invented method, wherein said adaptation is based not directly from said intermediate result but based instead on predictions, can be applied. Said prediction of a quantity, to be used in second sub-encoding a video frame, is based on the performance of said first sub-encoding when applied to a previous video frame, preferably only to a previous frame or frames.

It is not expected that there is any limit on the application of the described encoding methods in accordance with the present invention. For example, they can be applied to all types of framed data streams, including video, audio, 3-D multi-media data or combinations thereof. Said framed data encoding method uses prediction of a quantity, to be used in second sub-encoding of a frame, said prediction being based on the performance of a first sub-encoding step applied to a previous frame.

Said second sub-encoding methods can be based on wavelet transforms, matching pursuits, tree coding such as quadtree or binary tree coding or DCT (Direct Cosine Transformation) or similar. In the wavelet transform approach the number of levels, the quantization step or number of bitplanes, the indexes of coded coefficients can be adaptable parameters. Within matching pursuits approaches the dictionary, the amount of atoms selected around a macroblock, quantization parameters can be adaptable parameters. Within a tree coding approach thresholds and other parameters guiding the building of the tree representation can be adaptable parameters. When using meshes in 2-D or 3-D representations, the number of vertices and nodes to be used in said meshes can also be adaptable parameters.

Figure 9:
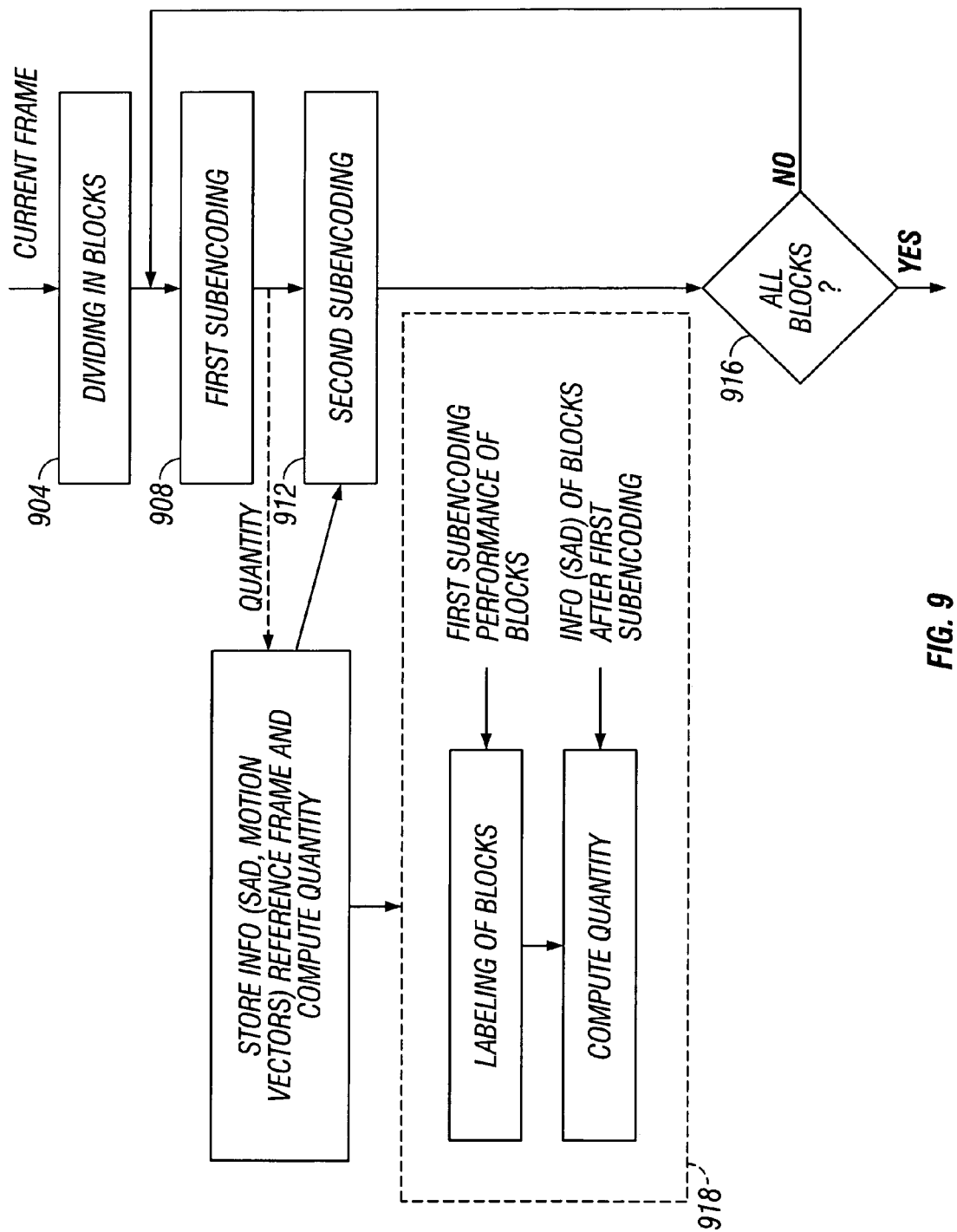
FIG. 9 is a flowchart illustrating an encoding process.

A block-oriented adaptive encoding method inn accordance with an embodiment of the present invention can be formalized as follows:

With respect to FIG. 9, an exemplary process for encoding in accordance to one embodiment of the invention is illustrated. It is a method of adaptive encoding at least a part of a frame of a stream of framed data comprising the steps of:

dividing said part of said frame into blocks (step 904);

performing a first sub-encoding step on a block (step 908); thereafter performing a second sub-encoding step on said first sub-encoded block (step 912), said second sub-encoding step adapting its encoding parameters based on a quantity of said first sub-encoded part of said frame being determined by prediction from a reference frame; and said steps are performed on another block of said part of said frame (decision step 916). The frame may be a video frame. Subsequently the method continues wherein said steps are performed on another block of said part of said frame.

Note that in the above described method only the determining of said quantity is related to the reference video frame.

The present invention also provides an adaptive encoding device being capable of taking into account resource limitations such as channel bandwidth limitations by adapting said second sub-encoding steps encoding parameters based on said quantity. The step of transmitting said second sub-encoded blocks over the channel can include taking into account channel bandwidth limitations dynamically, e.g. in the selection of encoding parameters.

Said first sub-encoding step can comprise, but is not limited to, performing motion estimation of a block with respect to said reference video frame and thereafter performing motion compensation of said block; and thereafter determining the error block, or more in general performing transformation parameter estimation of a block with respect to said reference video frame; thereafter performing a transformation compensation step on said block; and thereafter determining the error block. The motion estimation/compensation approach and the generalized method described here emphasizes that said first sub-encoding is related to a reference video frame but the invention is not limited thereto.

Said second sub-encoding can be selected from the group comprising of wavelet encoding, quadtree or binary coding, DCT coding and matching pursuits or similar.

In the above a reference video frame has been introduced as the reference video from which said quantity will be computed whereon adaptation is based. In some embodiments of the present invention said reference video frame is also the reference frame for the first sub-encoding step. It is clear that the method is applicable to encoding a sequence of video frames. The method comprises then the following steps:

determining for at least one current frame, selected from said sequence of frames an encoding parameter based on a quantity of said current frame, this determination being performed by prediction from a reference frame or frames which is also selected from said sequence of frames and thereafter encoding said current frame taking into account at least said encoding parameter. The encoding may also exploit measures of local macroblock (MB) activity. The frame may be a video frame. Generally, during the course of encoding said sequence other frames will be selected as current and as reference video frame.

A method in accordance with the present invention can be generalized as: determining an encoding parameter based on a quantity of a current frame, the encoding parameter being determined by prediction from a plurality of reference frames, also selected from said sequence of frames. The frame may be a video frame. In some embodiments said encoding takes into account at least one encoding parameter being determined directly from at least one of said reference frames, i.e. only from such frames. In another embodiment said encoding exploits an average of said encoding parameter of said current frame predicted and said encoding parameter of one of said reference frames. In another embodiment the following is selectably used: either said encoding being based on an encoding parameter based on said quantity being predicted or said encoding being based on a combination of said encoding parameter based on said quantify being predicted and said encoding parameter being determined directly from at least one of said reference frames. Said selection can be based on detection of oscillations in the generated sequence of encoding parameters.

The nature of said quantity, determined by prediction, can be described as a measure of the information content or energy or complexity within said current video frame. In a more particular embodiment said measure is derived from the sum of an absolute difference between the motion compensated current video frame and the previous video frame. For example, said measure is derived from the error norm between the motion compensated current video frame and the previous video frame.

The varying content of the sequence of video frames and the bandwidth limitations of the transportation channel can result either in quantization adaptations in said second encoding step or in complete skipping or discarding video frames, meaning not transmitting them or thus not performing said second encoding step. Discarding video frame is a so-called hard decision and can be understood as a kind of adaptation method in accordance with the present invention. The skip or discard method can exploit the result of said first sub-encoding method, for deciding whether the video frame will be skipped or not. In order to avoid an unnecessary first sub-encoding of a video frame that will not be further encoded and transmitted, the result of said first sub-encoding method is in an embodiment of the invention not used directly but a quantity of said result is predicted or estimated. This embodiment of the invention thus presents a method for encoding a sequence of frames of framed data comprising the step of determining for at least one current frame of said sequence of frames whether said current frame will be selected for encoding before encoding said current frame. Said selection is based on a prediction of a quantity of said current frames from reference frames. The frames may be video frames.

Note that said soft adaptation methods for encoding a sequence of frames of framed data can also be described as comprising the step of determining for at least one current frame of said sequence of frames which encoding parameters will be used for encoding said current frame before encoding said current frame with said encoding parameters. Said determining of encoding parameters is based on a prediction of a quantity of said current frames from reference frames. The frames may be video frames.

Recall the second aspect of the invention showing a method for encoding a video frame with respect to a reference video frame, said method both having adaptation capabilities in case of channel bandwidth limitations. Said method, having a first and second sub-encoded step, relies on a quantity of the to be encoded video frame, more precisely of first sub-encoded version of said to be encoded video frame, said quantity being predicted from a reference video frame, at least being first sub-encoded before said video frame (block 918 of FIG. 9). Said quantity is used for adapting encoding parameters of said second sub-encoding step. Said quantity computation is based on the labeling of blocks of said reference video frame, said labeling being based on the performance of said first sub-encoded step applied to said reference video frame.

Within said adaptive encoding method, a step of partitioning or dividing a reference frame into blocks, a step of labeling said blocks in accordance with the performance of the first sub-encoding applied to said reference frame, a step of computing a quantity based on said labeling of said blocks and performing a first and second sub-encoding step on the to be encoded frame can be distinguished. Only the reference frame or reference frames need be used for determining the quantity. The frames can be video frames. Said second sub-encoding step adapts its encoding parameters based on said quantity. In an embodiment said first and second encoding steps applied to said to be encoded frame are performed per block of said frame.

In the following, the current frame is the frame whose quantization parameter is being determined by the current operation of the bit rate control system. It is important to indicate which information is available to the control system and how the information can be transformed into estimations of coding results by means of a stochastic model. As explained above, the rate-distortion based methods proposed in the literature rely on a pre-analysis, more in particular a model exploiting parameters determined by pre-analysis of the to be encoded video frame. Motion compensation is applied on the entire frame before the control parameters are fixed in prior-art methods. It is because a measure of the current DFD (Displaced Frame Difference) complexity has to be provided to the control system. Most often, the measure of complexity is the mean absolute difference (MAD), i.e. the average of the absolute DFD pixel values. In the present invention the same R-D based control schemes can be used although not limited thereto but without pre-analysis. That means that, in accordance with an embodiment of the present invention, it is estimated, i.e. predicted, the parameter(s) that was (were) previously fixed by the pre-analysis. Now an embodiment disclosing a way to predict the MAD of the current frame, only using information from the past, is presented.

The mean absolute difference (MAD) of the current frame is predicted from information collected about the performances of the motion compensation of a previous frame. Three types of MB's are defined in the previous frame: (I) INTRA MBs. They are coded on their own, without reference to past or future frames. They appear in parts of the video scene where correlation is poor between successive frames. For the current frame, INTRA MBs are expected to be localized in the same parts of the scene as in the previous frame. It is thus reasonable to assume that the INTRA MB's contribution to the sum of absolute difference (SAD) is more or less constant for successive frames. (II) INTER MB's that are predicted with zero motion vectors (MV). They are often localized in still areas. For these, the prediction error is mainly due to quantization errors in the reference frame. It does not depend on the block translation motion model. It can be assumed that in these areas of the scene, the prediction error does not depend on the temporal distance between the reference and the predicted frame. So, for successive frames, the contribution to the SAD for these blocks is assumed to be constant. (III) INTER MB's that are predicted by a non-zero displacement. For these MB's, localized in moving areas, prediction errors mainly occur when the translational motion model does not fit the actual motion. Let us assume that the components of the motion that do not fit the translational model at time t−1 remain constant in a near future. Then, the displacement of the objects due to these components is proportional to the temporal distance between two samples of the scene, i.e. the time elapsed between two frames. Assuming that the area covered by the prediction error is proportional to this non-translational displacement, the contribution to the SAD is roughly estimated in proportion to the time passed between two frames, i.e. to the number of skipped frames if the interval between two frames is constant. The prediction of the current $MAD_t$ results from the above definition and considerations.

The above can be summarized by using the following formula:

$$MAD_t = \frac{SAD_{t-1|Intra \cup (Inter \cap ZeroMV)} + \frac{1+Skip_t}{1+Skip_{t-1}} \cdot SAD_{t-1|Inter \cap Non-ZeroMV}}{N} \quad (1)$$

where:
t(t−1) refers to the current (previous) frame,
N is the number of pixels of the frame,
$Skip_{t(t-1)}$ is the number of frame(s) skipped before encoding the current (previous) frame,
SAD refers to the sum of the absolute differences on a MB. Two classes of MB's are considered: the ones for which the compensation error magnitude is likely to be constant for successive frames (Intra-mode or Inter-mode without motion), and the ones for which the compensation error increases with the skip factor (Inter-mode with motion).

It should be emphasized that the above formula is only one example. The invention encompasses within its scope all types of formulas which are inspired by the above considerations.

Due to the delay introduced by the prediction, two paths appear in the dependency graph that links the QP values and the MAD values along the sequence (see FIG. 1). These two paths can be synchronized by using the average of the previous (available) and current (predicted) MAD instead of the current (predicted) MAD. Actually, the average replaces the predicted value only when an oscillation appears, i.e. when $|QP_{t-1} - QP_{t-2}| > QP_{t-1} - QP_{t-3}|$. Note that $MAD_t$ depends on $QP_{t-1}$ because $QPt_{t-1}$ impacts the quality of the reconstructed frame at t−1 and so the prediction error at time t. Due to the use of a pre-analysis approach to fix the QP the $QPt_1$ depends on $MAD_t$ while in the invented approach the QP depends essentially on $MAD_{t-1}$ when the complexity of the current frame is predicted from the previous frame.

The behavior of an R-D based rate control can be compared when an actual (as in the prior-art) or a predicted (as in the invention) frame complexity measure is used in order to validate the proposed prediction scheme. It illustrates one of the possible applications of the scheme. Nevertheless, note that the ability to predict the complexity of upcoming frames enables control of other parameters than the quantization scale. For example, in contrast to MPEG-2 broadcast application that uses a group of picture structure for which the frame interval is fixed, H.263 and MPEG-4 do allow variable frame skip. It is up to the rate control algorithm to decide on both spatial (quantization step) and temporal (frame rate) coding parameters. Skipping frames allows preserving enough bits for every coded picture and can ensure an almost constant picture quality along the sequence. For instance one can self-adjust the frame rate according to both the current picture content and the buffer status. This approach clearly out-performs methods that skip frames based only on buffer fullness. Nevertheless, in prior-art methods this again requires pre-analysis of all the frames that are likely to be coded. Being able to predict, as in the present invention, the complexity of a future P frame as a function of the skip factor strongly simplifies the algorithm. Indeed, combined with a rate distortion model of the coder, it permits the fixing of the minimal skip factor providing the required quality. Therefore, the present invention is not limited to adapting the quantization parameter but includes all type of adaptations of a second encoding step that can be partly influenced by predicted quantities.

Such a method can be formalized as follows:

A method of block-oriented adaptive encoding at least a part of a frame of a sequence of framed data with respect to a reference frame of the sequence comprising the steps of:

dividing said reference frame into blocks;

performing a first sub-encoding step on said reference frame with respect to a previous reference frame;

labeling said blocks of said reference frame based on said first sub-encoding steps performance and said blocks motion vector;

determining for each of said blocks of said reference frame a measure of a difference between related blocks in said previous reference frame;

computing a quantity from said measures of differences for said blocks and exploiting the labeling of said blocks;

performing said first sub-encoding step on a block of said frame; thereafter performing a second sub-encoding step on a block of said first sub-encoded frame, said second sub-encoding step adapting its encoding parameters based on said quantity. The frames may be video frames.

The method recited above may further include that said computing of said quantity takes into account the time elapsed between said current frame and said reference frame.

The method recited above may further include that said blocks of said reference frame have a first label when said blocks are intra-coded or when said blocks have a substantial zero motion vector, said blocks of said video frame have a second label otherwise, said computed quantity being the sum of:

the sum of all measures of differences of blocks with a first label; a normalized sum of all measures of differences of blocks with a second label multiplied with the time elapsed between said current frame and said reference frame. The frames may be video frames.

In the following, a conventional R-D based rate control algorithm is considered. Either a computed or a predicted complexity measure is used as model parameter. The performances are compared in both cases. The relevance of the proposed prediction scheme is deduced.

The performance of the invented encoding method is now illustrated by analyzing an embodiment thereof. The quantization parameter (QP) for an entire and single video object is selected to be the to-be-adapted parameter of said second encoding step. Nevertheless, in accordance with the present invention, the approach can be extended to multiple video objects or to macro-block level QP selection. The rate control model is the one proposed by the MPEG-4 scalable control scheme (SRC) but the invention is not limited thereto. It is scalable for various bit rates, and spatial or temporal resolutions. The SRC assumes that the encoder rate distortion function can be modeled as:

$$R = \frac{\alpha \cdot C}{Q} + \frac{\beta \cdot C}{Q^2} \quad (2)$$

R is the targeted encoding bit count. C denotes the complexity of the encoded frame, i.e. the mean absolute difference (MAD) of the prediction error for P frames. The quantization parameter is denoted as Q. The modeling parameters are denoted as $\alpha$ and $\beta$. They are defined based on the statistics of past encoded frames. Because of the generality of the assumption, the SRC is largely applicable. Note also that, for all the results provided below, the buffer size corresponds to half a second and frame are skipped when the buffer level achieve 80% of the buffer size.

Now for one sequence and one target bit rate, the reference rate control algorithm (using pre-analysis) with the invented predictive scheme, i.e. a scheme for which the pre-analysis (current frame MAD computation) is replaced by a prediction step.

Figure 2:
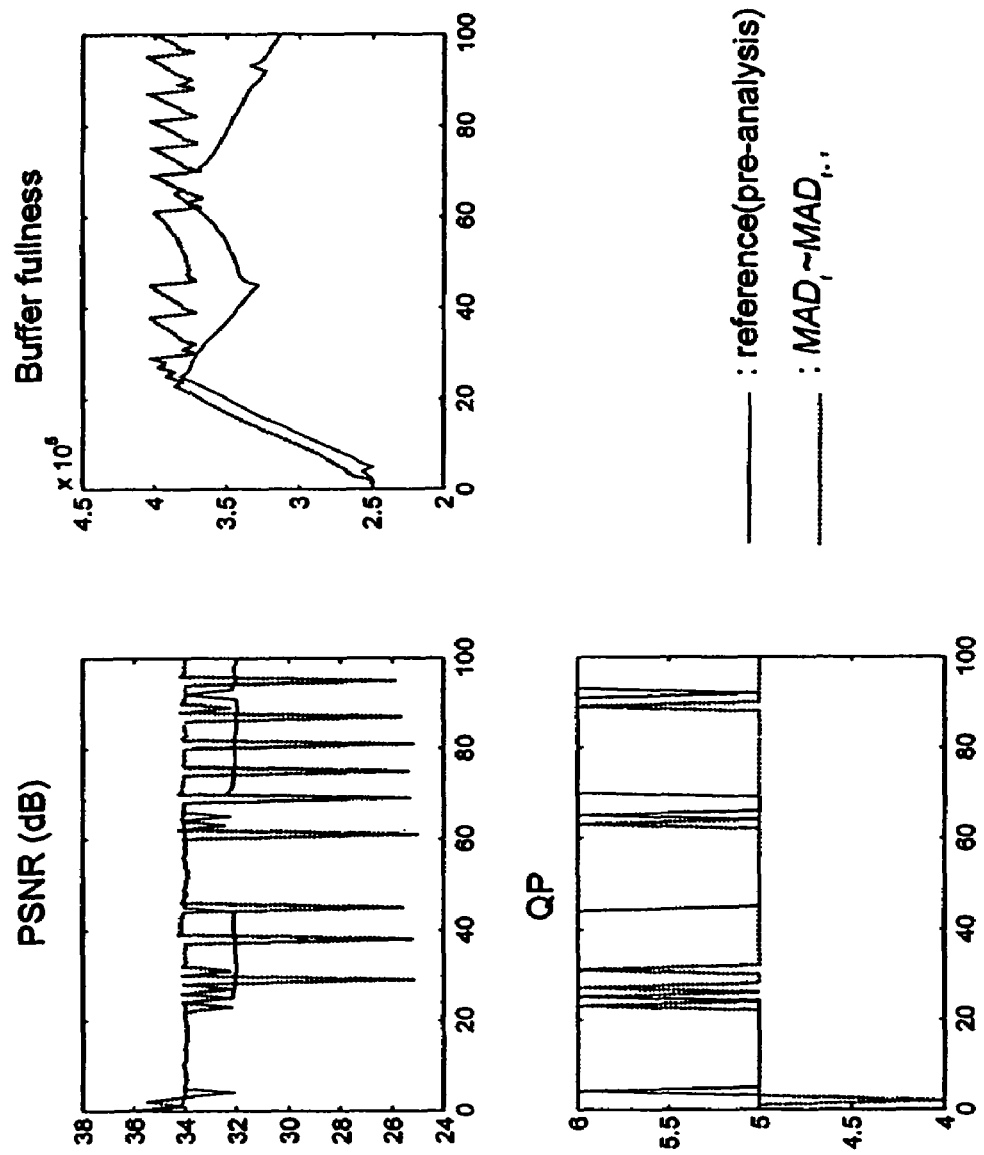
FIGS. 2-7 shows PSNR (signal to noise ratio), buffer fullness and QP as function of time for a reference approach, based on pre-analysis and a poor estimator (in FIG. 2), an estimator according to one embodiment of the invention (in FIG. 3) and a further improved embodiment based on averaging (in FIG. 4).

In FIG. 2, the previous MAD is used as an approximation of the current MAD, so there is no intention to relate said quantity to the complexity of the current video frame nor to use time difference between said reference and said current frame. This very simple prediction method is unfortunately not accurate enough. It severely degrades the system performances. Lots of frames are skipped (drops in the PSNR graph).

Figure 3:
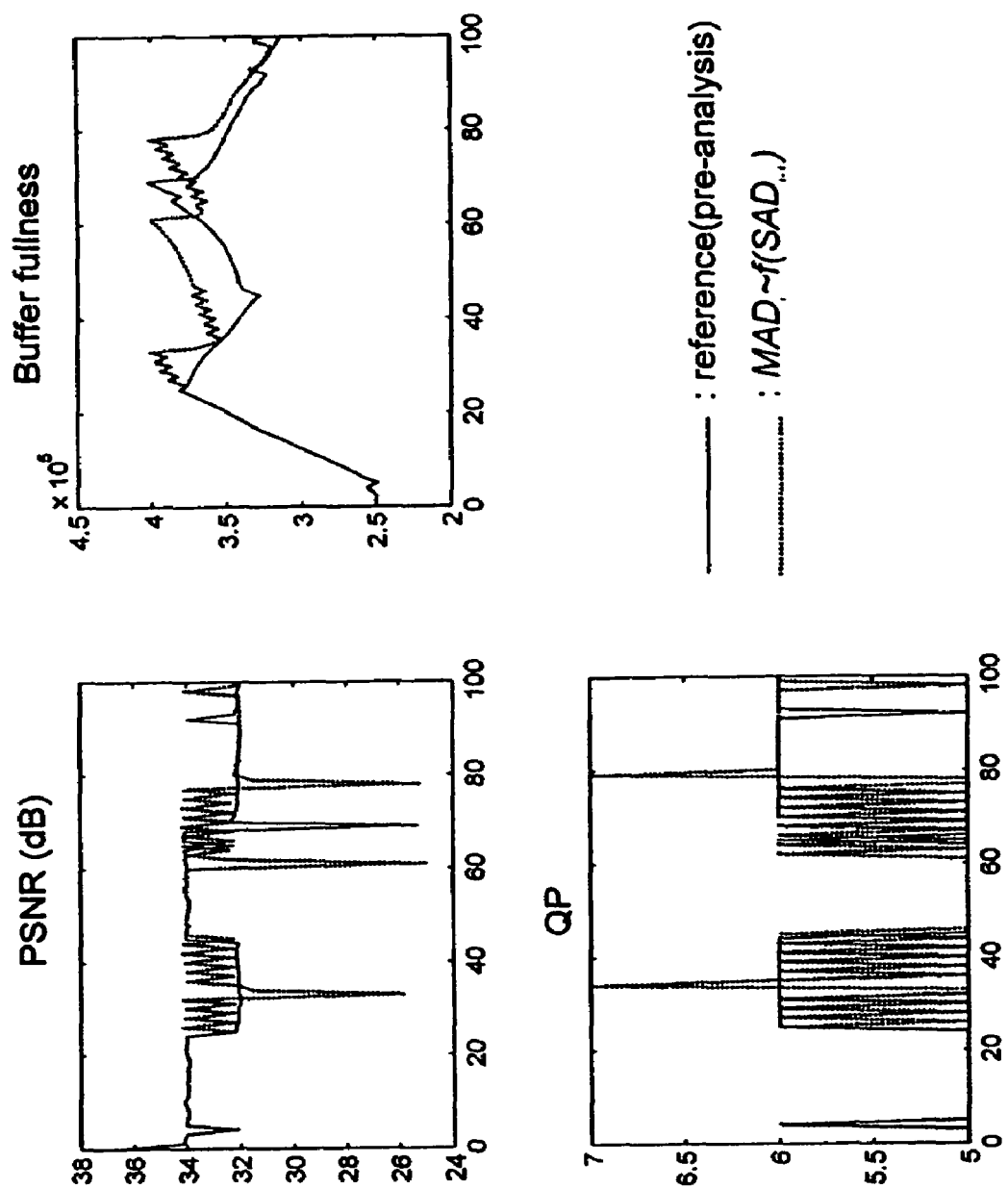

In FIG. 3, the behavior of the motion compensation on the previous frame is taken into account according to the Equation (1). Said equation predicts $MAD_t$ thereby implementing the approach of the invention. It improves the control so that fewer frames are skipped.

Figure 4:
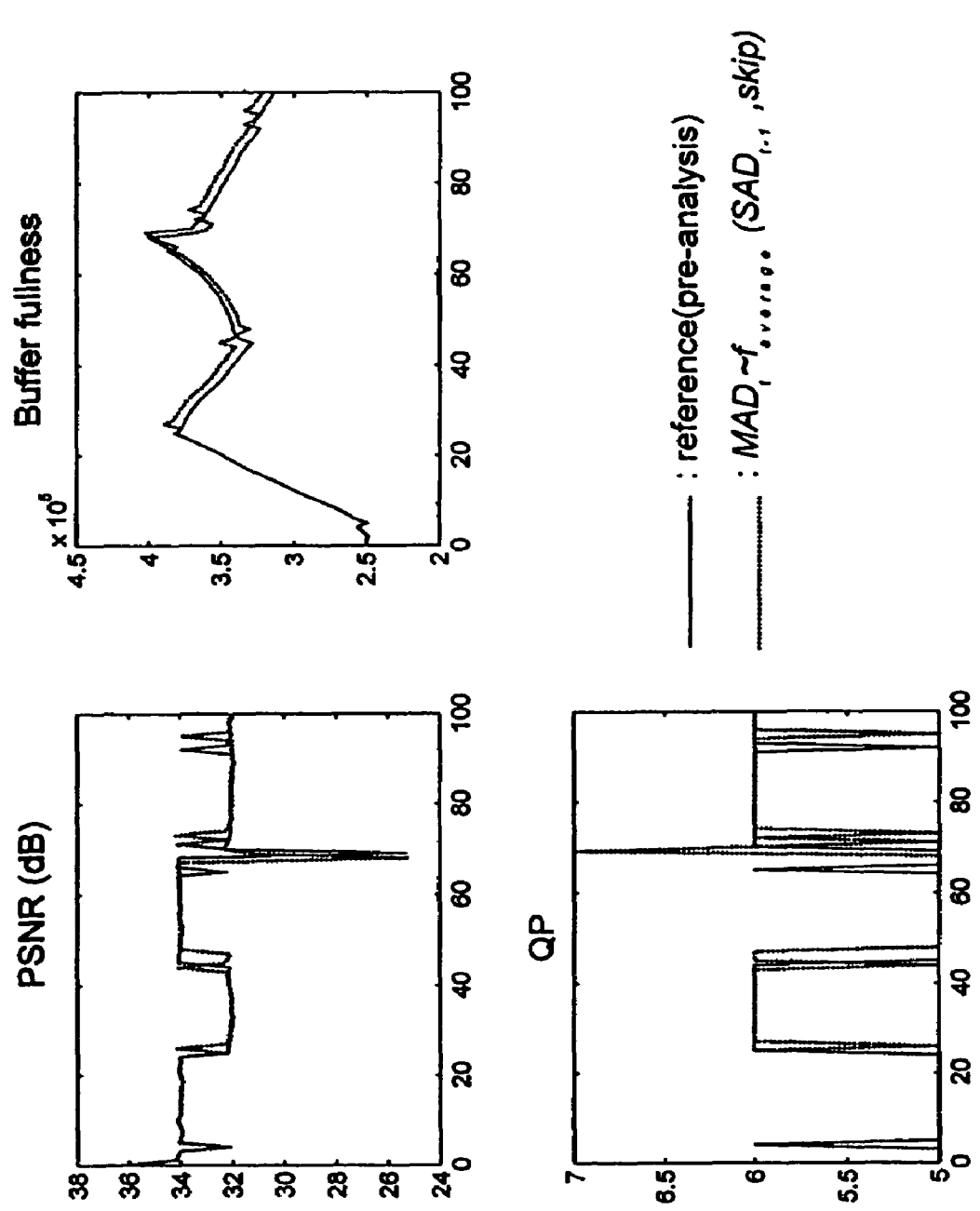

Due to the existence of two dependency paths oscillations can appear along the sequence of selected QP and engendered MAD. In FIG. 4, the current (predicted) MAD and the previous (computed) MAD are averaged when oscillations appear, which is a further embodiment of the present invention. The rate control performances are similar in both cases.

Figure 5:
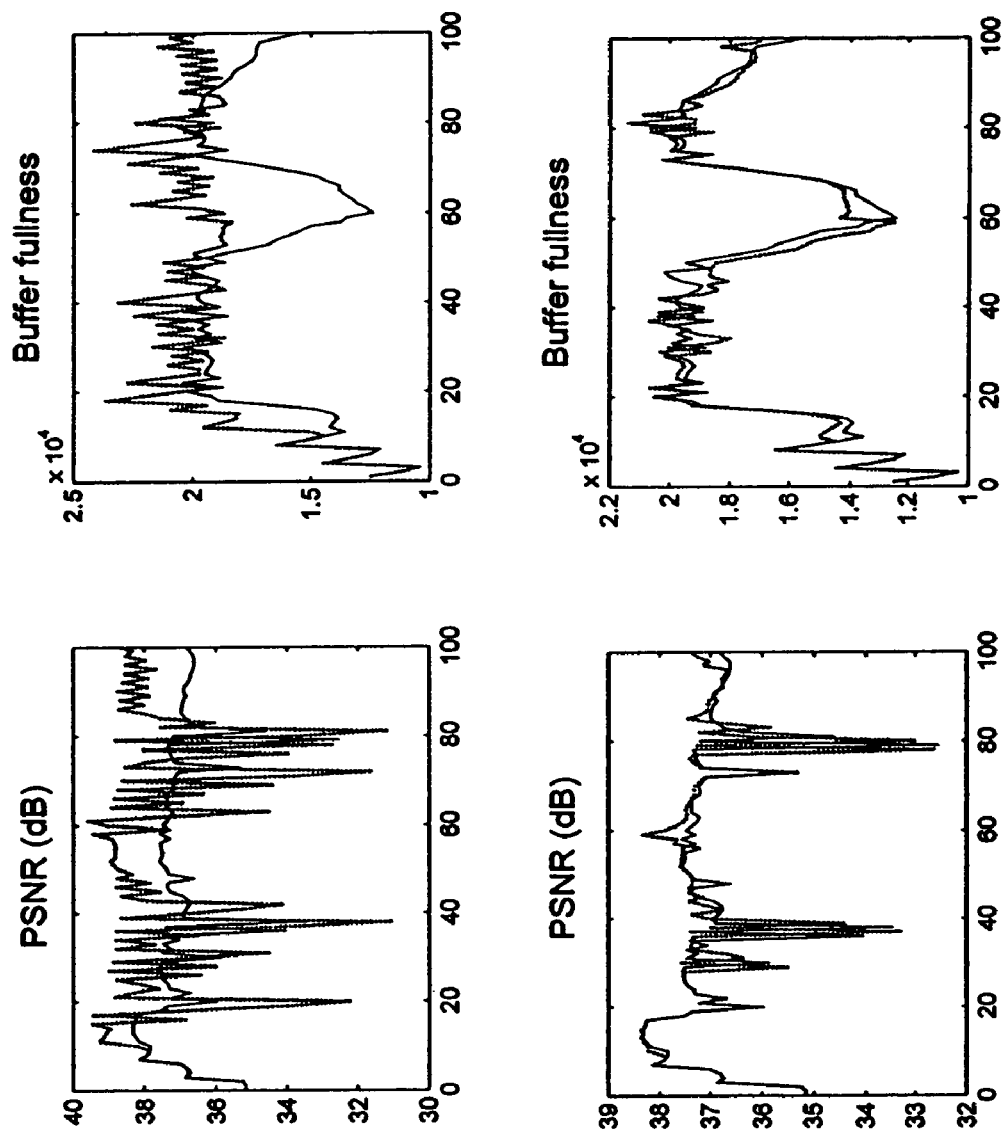
Figure 6:
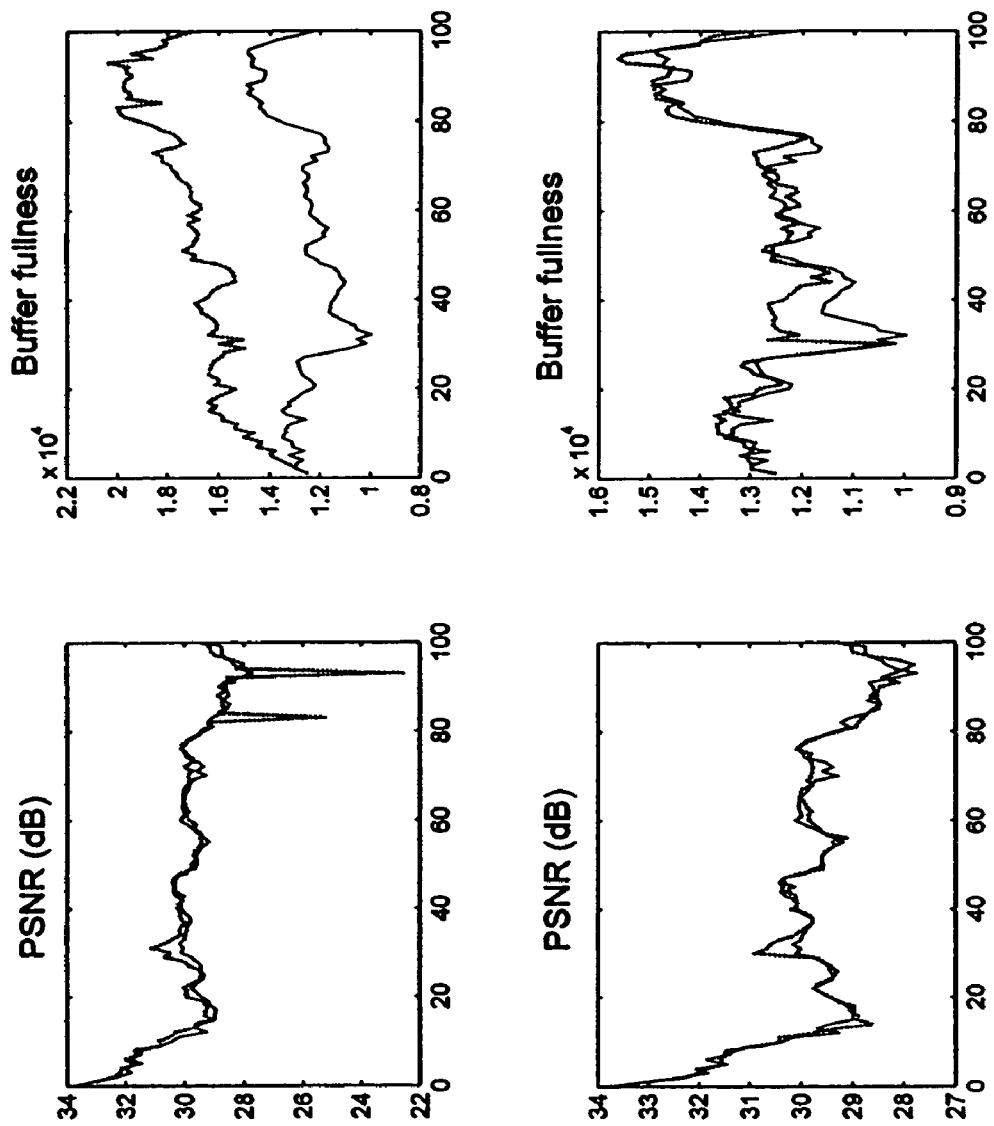
Figure 7:
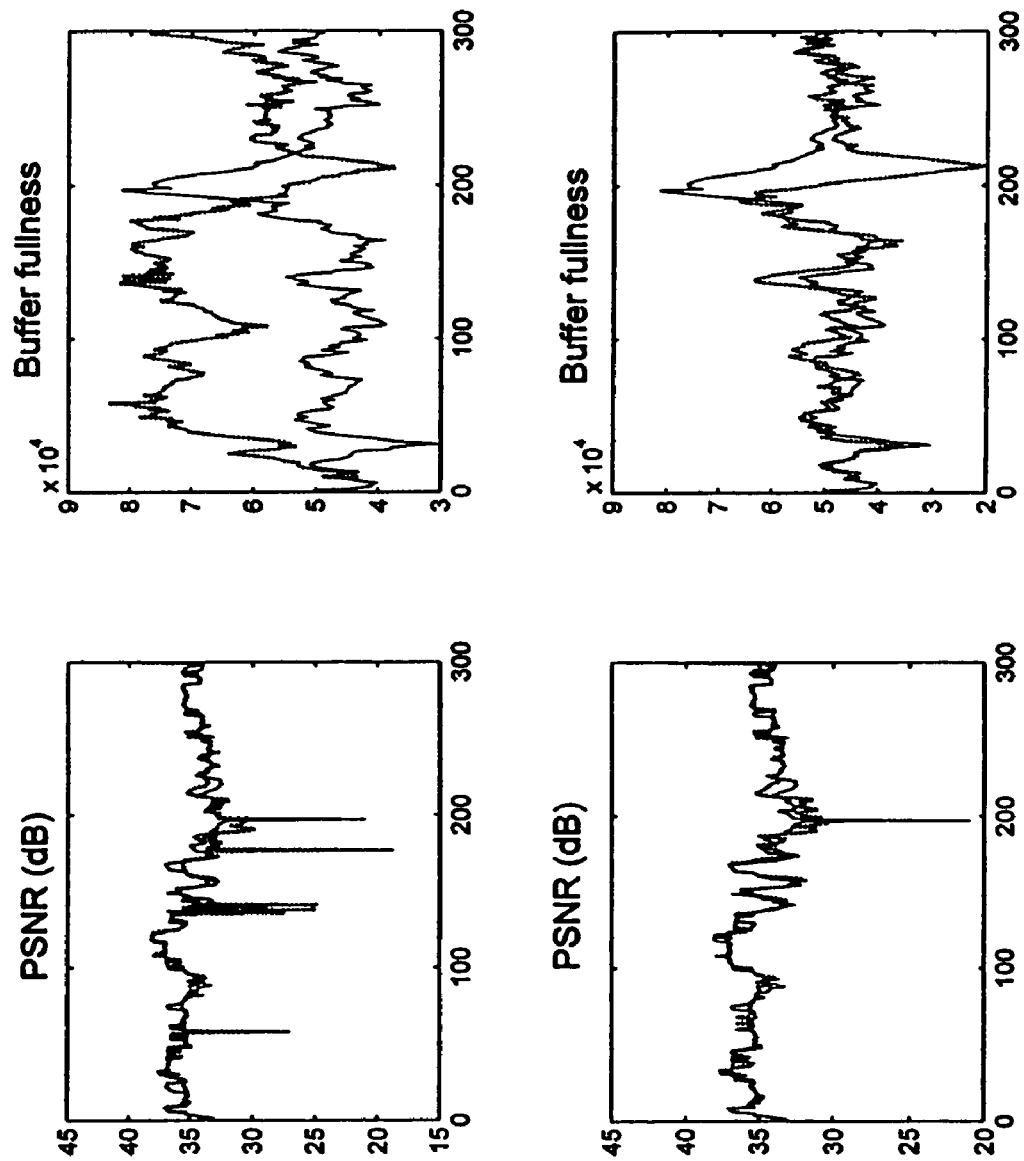

Additional comparisons are provided in FIGS. 5 to 7. On FIG. 5, an Akiyo sequence is coded at 50 kbits/s. Solid lines refer to the reference conventional scheme, i.e. the rate control with pre-analysis. Dotted lines refer to the predicted MAD. At the top, the very simple prediction is used. Current MAD is about the same as previous MAD. Again, it causes a poor control of the buffer level, which results in lots of skipped frames (large drops in the PSNR graph). On the bottom of FIG. 5, the invented scheme shows very similar performance as the reference one. Buffer level is controlled with similar performances in both schemes, so that the same number of frames is skipped for both schemes. In FIGS. 6 and 7, two sets of parameters are considered for the Foreman QCIF sequence. In FIG. 6, the first hundred frames of the sequence are encoded at 50 kbits/s. In FIG. 7, 300 frames are encoded at 200 kbits/s. At the top of these figures, buffer level and PSNR curves are provided both for the reference scheme (solid lines) and the simple prediction scheme (dotted lines). On the bottom, the reference scheme is compared with the proposed invented one (Equation (1) and average when oscillations appear). Again, one can conclude that the proposed predictive scheme enables a better control of the buffer level than the simple one and achieves performances that are similar to the reference one.

Note that more complex models adapt the QP on a macro-block basis. In addition to a measure of the average energy of the frame to encode, the R-D model is also parameterized by the energy of the current macro-block. This parameter is available in a one pass encoding process. So, being able to predict the average energy of the frame is enough to apply such MB-based R-D model to spatially localized encoding schemes. Nevertheless, it is worth noting that one could go further than just generalizing existing schemes. The prediction introduces latency in the control of the quantization parameter (QP). For example, a scene cut can only be detected once the considered frame has been coded. The ability to change the QP on a MB basis increases the freedom and flexibility of the rate control. It allows adapting the QP to the local complexity of the scene and achieving the target bit count more accurately. It should also enable a faster reaction to sharp scene changes. The scene change could be taken into account on the fly, while sequentially dealing with the blocks of the frame.

Note also that in this illustration only so-called P frames are involved. Naturally, B frames coding parameters can be treated in the same way. However, since B frames usually need fewer bits to code, extra efforts for the modeling are not always justified. A simple weighted average of quantization scales of its two anchor frames can be used alternatively.

Figure 8A:
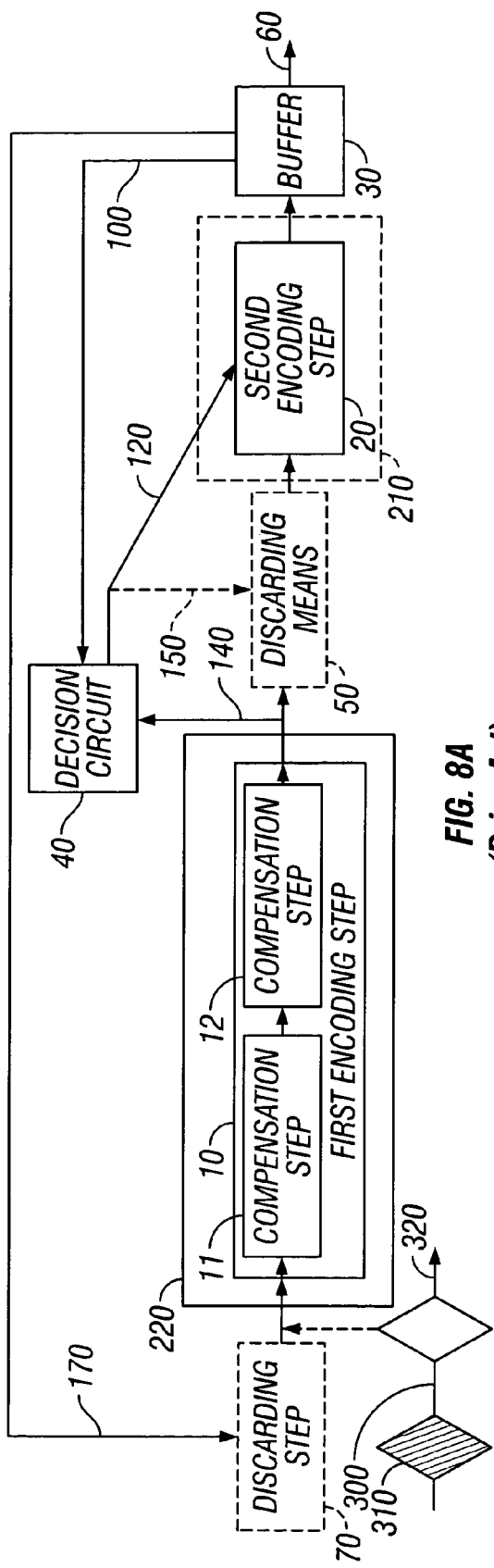
FIG. 8A shows a schematic diagram of conventional encoding scheme with a first encoding step (10) and a second encoding step (20) for encoding a video frame (320) on a time axis (300) with respect to a reference video frame (310).
Figure 8B:
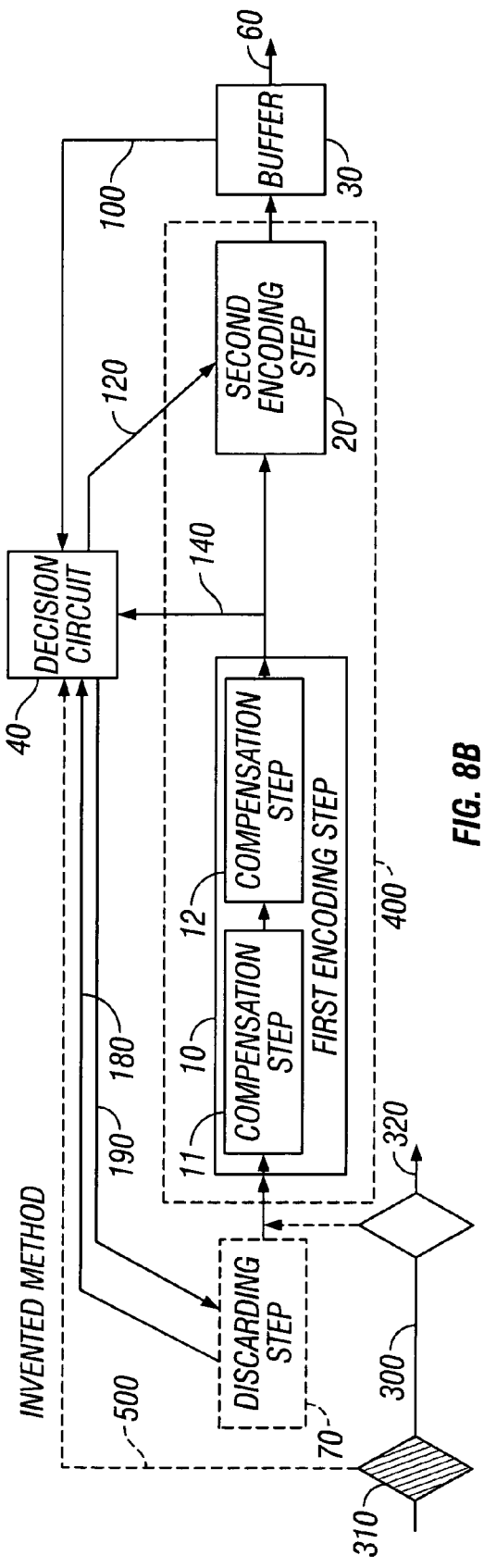
FIG. 8B shows an encoding scheme in accordance with an embodiment of the present invention.

FIG. 8B shows an embodiment of an adaptive encoding circuit in accordance with the present invention. FIG. 8B shows a schematic representation of an encoding apparatus with first sub-encoding circuit (10) and second sub-encoding circuit (20) for encoding a video frame (320) with respect to a reference video frame (310) of a sequence of frames on a time axis (300). The current video frame (320) in its encoded form is to be transmitted via a bandwidth limited channel (60), preferably being preceded by a buffering circuit (30). Optionally, a video frame discarding circuit is present in between said first and second sub-encoding circuits (10) and (20) but it is preferred if a skipping or discarding circuit (70) is located before said first sub-encoding circuit (10). Said first and second sub-encoding steps are executed in a block-based way. Reference number (400) represents the block loop meaning that each block is processed before the next block.

Hence, first and second sub-encoding circuits (10, 20) preferably execute in a similar fashion. The decision on how to adapt the bit rate is made a decision circuit (40). This adaptation decision optionally takes into account the output of buffer information (100) from the buffer circuit (30) and/or information referring to, and obtained by analysis, of the complexity of the first sub-encoded video frame (140) from the first sub-encoding circuit (10). The adaptation may be performed either by adapting parameters (120) of said second sub-encoding circuit (20) or by discarding said current video frame, e.g. in a skipping or discarding circuit (70). Said first sub-encoding circuit (10) optionally comprises circuits or means for transformation (motion) estimation and transformation (motion) compensation (11) and (12). Note that discarding based on buffer fullness information from said buffer circuit (30) only before first sub-encoding circuit (10) is also included within the present invention.

In accordance with an embodiment of the present invention the decision circuit (40) does not take into account in a direct way information of said whole first sub-encoded video frame (as this would be obtained too late in the process to be really useful). Instead it comprises means or a circuit to compute a quantity, which is assumed to be related to said whole first sub-encoded video frame, from a reference video frame (310) as indicated by line (500). This quantity, its definition, calculation and uses have been discussed in detail above. Note that the computation within said decision circuit (40) can use information from a skipping means. More in particular the skipping means can determine the time distance between the current video frame and a previously encoded reference video frame. Also note that line (500) only indicates which information is used for quantity computation, not where the information is actually stored. Indeed, in an embodiment of the present invention said reference video frame has already been first sub-encoded before said current video frame and it is the information obtained therefrom which is used for partitioning, labeling and actual computing. As said decision circuit (40) does not need said first sub-encoded video frame (140) as a whole, both said first and second sub-encoding circuits (10, 2220) can be merged within one loop (400), meaning that first and second sub-encoding of a block is performed before another block is processed. Moreover discarding in the discarding or skipping circuit (70) before first sub-encoding can now (optionally: also) be based on an estimated information (190) about the current video frame. Note that the computation within said decision circuit (40) can still use information (180) from the skipping or discarding circuit (70), more in particular the time distance between the video frame and the previously encoded reference video frame. Hence, the skipping or discarding circuit (70) may comprise means for determining this time difference.

The adaptive encoding circuit described above may take into account channel bandwidth limitations in the adaptive process, e.g. by adapting the second sub-encoding parameters. This adaptation may be included by altering the quantity used by the circuit for adaptation of the parameters in accordance with channel properties or limitations. The first sub-encoding circuit (10) may perform transformation parameter estimation of a block with respect to said reference frame followed by performing a transformation compensation step on said block and thereafter determining the error block.

The second sub-encoding circuit (20) may perform an encoding selected from the group comprising of wavelet encoding, quadtree or binary tree coding, DCT coding and matching pursuits coding or similar.

The first sub-encoding circuit (10) may include a division circuit for dividing the current frame or a reference frame into blocks. This division circuit may also be an independent circuit. This division circuit (independent of its implementation) may label the blocks of said reference frame in accordance with the performance of the first sub-encoding step applied to the reference frame. The decision circuit can then compute the quantity based on the labeling of said blocks which is then used for adapting the encoding parameters of the second sub-encoding circuit (2). The computing of the quantity may also take into account the time elapsed between the current frame and the reference frame as determined from the skipping circuit (70). Further information on encoding methods that may be employed by the first sub-encoding circuit are described in U.S. application Ser. No. 09/261,804, to Brockmeyer, et al. Filed Mar. 3, 1999, titled "Optimized Data Transfer and Storage Architecture for MPEG-4 Motion Estimation on Multi-Media Processors", which is incorporated by reference, in its entirety.

The labeling by the division circuit can be carried out in the following way: the blocks of the reference frame are given a first label when said blocks are intra-coded or when said blocks have a substantial zero motion vector and, otherwise, the blocks of said reference frame have a second label. The computed quantity can be formed by the sum of: the sum of all measures of prediction errors of blocks with a first label; a normalized sum of all measures of prediction errors of blocks with a second label multiplied with the time elapsed between said current frame and said reference frame.

A further embodiment of the present invention includes an adaptive encoding circuit in which at least a part of a current frame of a sequence of frames of framed data is processed with respect to a reference frame comprised in the sequence, further comprising a division circuit for dividing the reference frame into blocks and labeling the blocks of the reference frame in accordance with the performance of a first sub-encoding step applied to said reference frame by the first sub-encoding circuit. A decision circuit then computes the quantity based on the labeling of the blocks and decides, based on the quantity, to perform or skip encoding of the current frame.

A second sub-encoding circuit (20) may be implemented as described in U.S. Pat. No. 5,969,764, to Huifang, et al. entitled "Adaptive Video Coding Method", filed Jul. 18, 1997, which is incorporated by reference in its entirety. The second sub-encoding step for video frames will usually involve a compression step. The degree of compression can usually be adjusted by adjusting parameters of the compression. For example, if the compression technique is DCT, quantization parameters utilized by a quantizer in circuit (20) for quantizing transform coefficients to generate coded bits at a variable rate may be adjusted in accordance with a predetermined rate distortion model to increase or decrease the amount of code bits generated. The transform coefficients are generated by applying a specific transformation to the data, e.g. DCT. The rate distortion model exploits the quantity described above which is derived only from a reference frame or frames. These steps may be performed by a microprocessor or a programmable digital element such as a PAL, PLA, FPGA, or similar.

The above encoding circuit(s) may be implemented as a self-contained unit such as an accelerator card for a personal computer or may be implemented on a computing device such as a personal computer or server as is known to the skilled person by programming the method steps in software. Hence, the word "circuit" should be understood in the widest sense and includes implementation in either software or hardware. The computer or server may be programmed to carry out any of the method steps or any combination of steps described above (especially the combinations described in the attached claims and described in the Summary of the Invention, above) in accordance with the present invention. Alternatively, these same method steps or combination of method steps may be programmed into a dedicated processor as may be used on a board or card for insertion into a server, a computer or the node of a telecommunications network. The combination of dedicated and programmable elements in one or more of the circuits described above may be advantageous, e.g. the use of programmable digital elements such as programmable gate arrays, especially Field Programmable Gate Arrays, PAL's, PLA's, etc. can provide factory or field programmability and allow updates to encoding algorithms without change of hardware.

The present invention may also be used as part of a telecommunications system that is any system capable transmitting and receiving signals, such as, but not limited thereto, a computer, a telephone system, a Local Area Network, a Wide Area Network, the Internet, a mobile telecommunications system, a cellular telephone system, a Metropolitan Access network, a satellite communication system radio or television.

What is claimed is:

1. A method of adaptive encoding at least a part of a current frame of a sequence of frames of framed data, with respect to a reference frame comprised in the sequence, the method comprising:
   dividing the reference frame into blocks and identifying selected blocks of the reference frame in accordance with the performance of a first sub-encoding that is applied to the reference frame;
   computing a characteristic based on the identifying of the blocks and from the frames of the sequence only those frames that are a reference frame, wherein the identifying of the blocks depends upon motion vectors determined for the blocks, and wherein the blocks of the reference frame have a first identity when the blocks are intra-coded or when the blocks have a substantial zero motion vector, the blocks of the reference frame have a second identity otherwise, the computed characteristic being based on:
      measures of prediction errors of blocks with the first identity; and
      measures of prediction errors of blocks with a second identity combined with the time elapsed between the current frame and the reference frame;
   performing the first sub-encoding on the current frame; and
   performing a second sub-encoding on the first sub-encoded frame, the second sub-encoding adapting at least one encoding parameter based at least in part upon the computed characteristic.

2. The method of claim 1, wherein the characteristic is a sum of at least:
   the sum of all measures of prediction errors of blocks that have the first identity; and
   a normalized sum of all measures of prediction errors of blocks that have the second identity multiplied by the time elapsed between the current frame and the reference frame.

3. A method of adaptive encoding at least a part of a current frame of a sequence of frames of framed data, with respect to a reference frame comprised in the sequence, the method comprising:
   dividing the reference frame into blocks, wherein the blocks of the reference frame have a first identity when the blocks are intra-coded or when the blocks have a substantial zero motion vector, the blocks of the reference frame have a second identity otherwise, computing a characteristic which is based on:
      measures of prediction errors of blocks that have the first identity, and
      measures of prediction errors of blocks that have the second identity combined the time elapsed between the current frame and the reference frame;
   identifying selected blocks of the reference frame in accordance with the performance of a first sub-encoding that is applied to the reference frame;
   computing a characteristic based on the identity of the blocks;
   performing the first sub-encoding on the current frame; and
   performing a second sub-encoding on the first sub-encoded frame, wherein the second sub-encoding adapts at least one encoding parameter based on the computed characteristic.

4. The method of claim 3, wherein the characteristic is a sum of at least:
   the sum of all measures of prediction errors of blocks that have the first identity; and
   a normalized sum of all measures of prediction errors of blocks that have the second identity multiplied by the time elapsed between the current frame and the reference frame.

5. A method of adaptive encoding at least a part of a current frame of a sequence of frames of framed data, with respect to a reference frame comprised in the sequence, the method comprising:
   dividing the reference frame into blocks and identifying selected blocks of the reference frame in accordance with the performance of a first sub-encoding that is applied to the reference frame, wherein the identifying selected blocks depends upon motion vectors determined for the blocks;
   computing a characteristic indicative of an energy content, the characteristic being determined by prediction without using a result of the first sub-encoding of the current frame, without using blocks of the current frame, and based on the identifying of the blocks and from the frames of the sequence only those frames that are a reference frame, wherein computing of the characteristic is based upon the time elapsed between the current frame and the reference frame or frames;
   performing the first sub-encoding on the current frame; and
   performing a second sub-encoding on the first sub-encoded frame, the second sub-encoding adapting at least one encoding parameter based at least in part upon the computed characteristic, wherein the blocks of the reference frame have a first identity when the blocks are intra-coded or when the blocks have a substantial zero motion vector, the blocks of the reference frame have a second identity otherwise, the computed characteristic being the sum of:
      the sum of all measures of prediction errors of blocks with the first identity; and
      a normalized sum of all measures of prediction errors of blocks with the second identity multiplied with the time elapsed between the current frame and the reference frame.

6. A method of adaptive encoding at least a part of a current frame of a sequence of frames of framed data, with respect to a reference frame comprised in the sequence, the method comprising:
   dividing the reference frame into blocks;

identifying selected blocks of the reference frame in accordance with the performance of a first sub-encoding that is applied to the reference frame;

performing the first sub-encoding on the current frame;

computing a characteristic indicative of an energy content based on the identifying of the blocks and from the frames of the sequence only those frames that are a reference frame, wherein the characteristic is determined by prediction without using the first sub-encoded frame and without using blocks of the current frame, wherein computing of the characteristic is based upon the time elapsed between the current frame and the reference frame or frames, and wherein the computing of the characteristic is derived at least in part by calculating the time elapsed between the current frame and the reference frame wherein the blocks of the reference frame have a first identity when the blocks are intra-coded or when the blocks have a substantial zero motion vector, the blocks of the reference frame have a second identity otherwise, the computed characteristic being the sum of:

the sum of all measures of prediction errors of blocks that have the first identity; and a normalized sum of all measures of prediction errors of blocks that have the second identity multiplied by the time elapsed between the current frame and the reference frame;

performing the first sub-encoding on the current frame; and performing a second sub-encoding on the first sub-encoded frame, wherein the second sub-encoding adapts at least one encoding parameter based on the computed characteristic.

* * * * *

UNITED STATES PATENT AND TRADEMARK OFFICE
CERTIFICATE OF CORRECTION

PATENT NO. : 7,616,690 B2  Page 1 of 1
APPLICATION NO. : 10/001736
DATED : November 10, 2009
INVENTOR(S) : Christophe De Vleeschouwer It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 833 days.

Signed and Sealed this

Nineteenth Day of October, 2010

David J. Kappos
*Director of the United States Patent and Trademark Office*